United States Patent [19]
Allcock et al.

[11] Patent Number: 5,548,060
[45] Date of Patent: Aug. 20, 1996

[54] SULFONATION OF POLYPHOSPHAZENES

[75] Inventors: Harry R. Allcock; Eric H. Klingenberg, both of State College, Pa.; Mark P. Weller, Los Alamos, N.M.

[73] Assignee: Penn State Research Foundation, Inc., University Park, Pa.

[21] Appl. No.: 287,174

[22] Filed: Aug. 8, 1994

[51] Int. Cl.$^6$ .................................................. C08F 8/36
[52] U.S. Cl. ........................ 528/487; 525/538; 528/167; 528/168; 528/169; 528/222; 528/224; 528/398; 528/399; 528/400; 528/480
[58] Field of Search ...................... 525/538; 528/167, 528/168, 169, 222, 224, 398, 399, 400, 480, 487

[56] References Cited

U.S. PATENT DOCUMENTS

| | | | |
|---|---|---|---|
| 4,259,191 | 3/1981 | Wagner | 252/8.55 |
| 4,440,921 | 4/1984 | Allock et al. | 528/168 |
| 4,704,229 | 11/1987 | Brunel et al. | 252/352 |
| 4,880,622 | 11/1989 | Allcock et al. | 514/772.3 |
| 4,959,442 | 9/1990 | Ohkawa et al. | 528/168 |
| 5,053,451 | 10/1991 | Allcock et al. | 524/600 |
| 5,104,947 | 4/1992 | Schacht et al. | 525/538 |
| 5,149,543 | 9/1992 | Cohen et al. | 424/499 |

OTHER PUBLICATIONS

Allcock, et al., "Diazo Coupling of Catecholamines with Poly(organophosphazenes)," *Macromolecules*, 16:1401 (1983).
Allcock, et al. "Sulfonation of (Aryloxy)–and (Arylamino)–phosphazenes: Small–Molecule Compounds, )Polymers and Surfaces," *Chem. Mater.*, 3:1120 (1991).
Allcock, et al., "Alkenesulfonation of Cyclic and High Polymeric Phosphazenes," *Macromolecules*, 26:5512–5519.
Goldschmidt, et al. "The Reaction of Propane Sultone with Guanosine, Adenosine and Related Compounds," *Heterocycl. Chem.*, 11:719–722 (1974).
Hany and Genies, "Polyanilines with Covalently Bonded Alkyl Sulfonates as Doping Agent. Synthesis and Properties," *Synthetic Metals*, 31:369–378 (1989).
Monotoneri, et al. "New Acid–Polyfunctional Water–Soluble Phosphazenes: Synthesis and Spectroscopic Characterization," *Macromol. Sci. Chem.* A26(4):645 (1989).
Bergeron et al., "Water–Soluble Conducting Poly(aniline) Polymer" *J. Chem. Soc. Chem. Commun.*, 180–183 (1990).
Fisher, R. F., "Propane Sultone," *Ind. and Eng. Chem.*, 56(3):41–45 (1964).
Ganapethiappan, et al., "A New Class of Cation Conductors: Polyphosphazene Sulfonates," *Macromolecules* 21:2299 (1988).
Monotoneri, et al., "On the Reaction of Catenpoly(diphenoxy–$2^5$–phosphazenes) with Sulfur Trioxide" *Macromol. Chem.* 190:191 (1989).
Mustafa, "The Chemistry of Sultones and Sultams" *Chem. Reviews*, 55:195 (1954).
Rapko, et al., "The Reactions of Trimethyloxonium Fluoroborate with Alkylamino–and Phenyl–Substituted Cyclotriphosphonitriles," *Inorg. Chem.* 9(6):1401 (1970).

*Primary Examiner*—Shelley A. Dodson
*Attorney, Agent, or Firm*—Cheryl K. Zalesky; Kilpatrick & Cody

[57] ABSTRACT

A method for the alkylsulfonation of polymeric and cyclic trimer phosphazenes that includes reacting the phosphazene with a sultone. This method can be used to prepare sulfonated phosphazenes that are useful as biomedical materials, membranes, reversibly cross-linkable polymers, surfactants, and polyelectrolytes.

16 Claims, 5 Drawing Sheets

STARTING POLYMERS
$$[NP (OCH_2CF_3)_x (OCH_2CH_2OCH_2CH_2NH_2)_y]_n$$

| compd | x | y |
|---|---|---|
| 23 | 0 | 2 |
| 24 | 0.4 | 1.6 |
| 25 | 0.86 | 1.14 |
| 26 | 1.76 | 0.24 |
| 27 | 2 | 0 |

STARTING POLYMERS

[NP (OCH$_2$CF$_3$)$_x$ (OCH$_2$CH$_2$OCH$_2$CH$_2$NH$_2$)$_y$]$_n$

| compd | x | y |
|---|---|---|
| 23 | 0 | 2 |
| 24 | 0.4 | 1.6 |
| 25 | 0.86 | 1.14 |
| 26 | 1.76 | 0.24 |
| 27 | 2 | 0 |

FIG. 1A

ALKYL SULFONATED POLYMERS

[NP (OCH$_2$CF$_3$)$_x$ (OCH$_2$CH$_2$OCH$_2$CH$_2$NH$_2$)$_y$ - (OCH$_2$CH$_2$OCH$_2$CH$_2$NHCH$_2$CH$_2$CH$_2$SO$_3$H)$_z$]$_n$

| compd | x | y | z |
|---|---|---|---|
| 28 | 0 | 0.95 | 1.05 |
| 29 | 0.4 | 0.83 | 0.77 |
| 30 | 0.86 | 0.57 | 0.57 |
| 31 | 1.76 | 0.10 | 0.14 |

FIG. 1B

—[NP(D)$_2$]$_n$— $\longrightarrow$ —[N$^+$P(D)$_2$]$_x$NP(D)$_2$)$_y$]$_n$— with substituent CH$_2$(CH$_2$)$_2$CH$_2$SO$_3^-$ on N$^+$ x + y = 2 z = 1 or 2 n = 3 to 50,000

D =   —(CH$_2$)$_m$CH$_3$     m = 0-10

—CH=CH(CH$_3$)

—CH$_2$CH(CH$_3$)CH$_2$CH$_3$

—CH$_2$CH$_2$CH(CH$_3$)$_2$

—CH$_2$CH$_2$C(CH$_3$)$_3$

—O(CH₂)ₘ—   m = 1-10

—O(CH₂CH₂O)ₘ—   m = 1-10

—O(CH₂CH₂CH₂O)ₘ—   m - 1-10

—O(CH₂CH(CH₃)O)ₘ—   m = 1-10

—O(CH₂)ₖ(CH=CH)ₗ(CH₂)ₘ—   k + l + m = 1-10

—O(CH₂)ₖ(CC)ₗ(CH₃)ₘ—   k + l + m = 1-10 k + l + m = 1-10

SULFONATION OF POLYPHOSPHAZENES

BACKGROUND OF THE INVENTION

This invention is in the area of polymer chemistry, and in particular is a method for the sulfonation of cyclic trimer and polymeric phosphazenes, and the products produced thereby.

The design and synthesis of hydrophilic or water-soluble polymers is of considerable technological interest for a wide range of applications, including for metal chelation and the preparation of anti-static materials. Hydrophilicity is also an important factor in the surface behavior of biomedical materials. Sulfonic acid groups are one of the more important substituent groups used to impart hydrophilic character to a polymer. Polymers that bear sulfonic acid groups are currently used in ion-exchange resins, nonthrombogenic biomaterials, reverse osmosis membranes anti-static materials, and bacteriostats.

Polyphosphazenes are a broad class of macromolecules based on the repeating unit $(NPR_2)n$. One of the primary methods for the synthesis of these polymers is illustrated in Scheme I. Poly(dichlorophosphazene) (2) reacts with a wide variety of nucleophiles to yield high molecular weight polymers with properties that vary widely based on the structure of the substituent. The stability of the phosphorus-nitrogen backbone makes this class of macromolecules particularly suitable for side group and surface modification.

Examples of poly(organophosphazenes) and methods for their synthesis include those described in U.S. Pat. No. 4,440,921, which discloses that biologically active molecules containing a carboxylic acid residue can be covalently attached to a polyphosphazene via condensation with a pendant amino group on the polyphosphazene (see also Allcock, H. R.; Hymer, W. C.; Austin, P. E. *Macromolecules* 1983, 16, 1401); U.S. Pat. No. 4,880,622 which discloses novel poly(organophosphazene)s that are useful for the controlled delivery of pharmaceuticals, pesticides, herbicides, plant growth regulators, and fertilizers; U.S. Pat. No. 5,053,451 which discloses that poly(carboxylatophenoxy)phosphazene can be ionically cross-linked to form a hydrogel; and U.S. Pat. No. 5,149,543 which discloses a composition that includes a biological material such as a liposome, virus, procaryotic cell, or eucaryotic cell encapsulated in an ionically cross-linked poly(organophosphazene) or other polyelectrolyte.

Scheme I

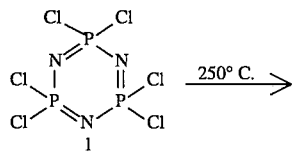

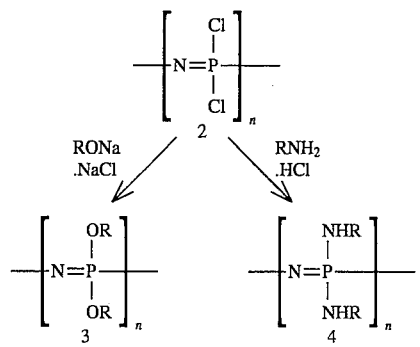

The surface sulfonation of aryloxy- and arylaminophosphazenes has been accomplished with concentrated sulfuric acid (Scheme II, reaction A; Allcock, R. R. et al., 1991, *Chem Mater.* Vol. 3, p 1120). Aryloxypolyphosphazenes can also be sulfonated with sulfur trioxide (Monotoneri, E. et al., 1989, *Macromol. Sci. Chem.* Vol. A26, No. 4, p 645, Monotoneri. E. et al., 1989, *Macromol. Chem.* Vol. 190, p 191). However, aryloxy and arylamino polyphosphazenes are rigid polymer systems with high glass transition temperatures. The rigid character of these polymers decreases their use for many applications in which elastic behavior is desired.

Polymers that contain etheric substituent groups are useful as biomaterials, as polyelectrolytes and in battery applications, among others. Sulfonation of ether containing polymers can provide materials with enhanced biocompatibility and conductivity. Sulfonated etheric polyphosphazenes can be grafted onto the surface of other polymers via ultra-violet (UV), gamma, or electron beam irradiation to provide composite materials with a range of properties for a number of applications.

Polyphosphazenes with etheric substituent groups cannot be sulfonated with sulfuric acid or sulfur trioxide because etheric polyphosphazenes decompose in acidic conditions. Polyphosphazenes with etheric side groups and sulfonic acid groups have been synthesized by Shriver and coworkers via the reaction of sodium ethoxy sulfonate with poly(dichlorophosphazene), followed by Scheme II

A.

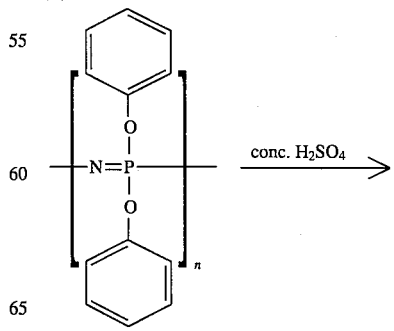

-continued
Scheme II

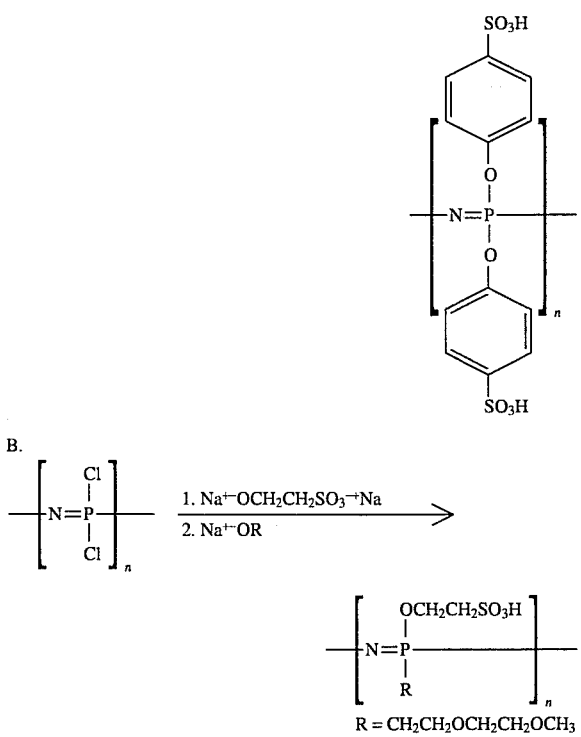

treatment with a second etheric nucleophile (Scheme II, reaction B; Ganapethiappan, S. et al., 1988, *Macromolecules*, Vol. 21, p 2299). This method has several limitations. First, sodium ethoxy sulfonate has only a limited solubility in the etheric solvents used for the reaction. Second, the use of a difunctional reagent results in crosslinking of the polymer chains. Although the crosslinks can be broken by the addition of a second nucleophile, this introduces an unwanted complication to the process. This reaction is also limited by the premature precipitation of the polymers from solution. The most obvious disadvantage of this system is the inability to carry out surface reactions. The sulfonation must be performed on the bulk polymer in solution. Surface sulfonation of polymers is desirable for the preparation of certain biomaterials, especially those used as prosthetic devices inside the body. Surface sulfonation increases blood compatibility, while enabling the bulk of the material to remain unsulfonated and therefore retain its specific properties, such as elasticity.

An improved synthetic approach to the sulfonation of polyphosphazenes would be useful in the development of new biomedical materials, membranes, reversibly crosslinkable polymers, surfactants, controlled drug release devices, such as microparticles and nanoparticles that encapsulate a substance to be delivered, new ion exchange resins, antistatic materials, and coatings for electronics and polyelectrolytes.

Therefore, it is an object of the present invention to provide a new method for the sulfonation of polymeric and cyclic trimer phosphazenes.

It is another object of the present invention to provide a method for the sulfonation of phosphazenes that can be carried out as a bulk or surface reaction.

It is another object of this invention to provide a new class of sulfonated polyphosphazenes for use a biomaterials, antistatic agents, polyelectrolytes, and for other applications.

SUMMARY OF THE INVENTION

A method for the sulfonation of polymeric and cyclic trimer phosphazenes is provided that includes reacting the phosphazene with a sultone, preferably a 1,3-sultone. The disclosed method of sulfonation offers the ability to synthesize sulfonated polyphosphazenes with a range of chemical and physical properties by the appropriate selection of the polymeric or cyclic trimer phosphazene and appropriate selection of the sultone.

The chemical structure of the product of sulfonation of polymeric or cyclic trimer phosphazenes can be elucidated using standard chemical methods. For example, sulfonation can occur at the ring nitrogen atoms of cyclic trimer phosphazenes that bear electron-donating side groups. The reaction of 1,3-sultone with ring nitrogen atoms produces zwitterionic compounds. Cyclotriphosphazenes with geminal amino side groups also undergo ring nitrogen atom alkylsulfonation. However, in this case, alkylsulfonation proceeds rapidly to yield multiple sulfonation products, including species with pendant sulfonic acid groups. Aryloxycyclotriphosphazenes that bear only one exocyclic amino group attached directly to a ring phosphorus atom do not undergo ring nitrogen alkylsulfonation with 1,3-sultone. However, the sodium salts of these polymers do react with 1,3-sultone to produce mono- and di-sulfonated products. The electron-withdrawing influence of the phosphazene ring can be reduced by the interposition of a spacer group between the amino group and the ring phosphorous atoms. Cyclic trimers of this type react with 1,3-sultone under mild conditions to produce sulfonated products.

Sultone sulfonation occurs with polymeric aminophosphazenes that bear amino groups linked directly to the backbone of the polymer to yield polymers with low amounts of both zwitterionic groups (resulting from reaction of the sultone with the backbone) and substituent sulfonic acid groups (resulting from reaction of the sultone with the amino substituent group). Even the small amount of introduced sulfonic acid groups can change the properties of the polyphosphazenes, increasing solubility in polar media and rendering the macromolecules susceptible to ionic crosslinking in the presence of divalent cations. Polymers with amino groups separated from the polymer chain by spacer groups react with sultones under milder conditions than do polymers with the amino groups linked directly to the backbone. These polymeric sulfonic acids show typical characteristics of ionomers.

In an alternative embodiment, polymeric and cyclic trimer phosphazenes that bear nucleophilic groups other than amino groups can be reacted with a selected sultone to provide a desired product. The nucleophile can be activated, as necessary, by conversion to a metal salt or other known activated species to enhance the product yield.

DESCRIPTION OF THE DRAWINGS

FIGS. 1A and 1B provide the chemical structures of representative starting cyclotriphosphazenes and their alkanesulfonated products.

DETAILED DESCRIPTION OF THE INVENTION

I. Definitions

A. General Definitions

Figure 2:
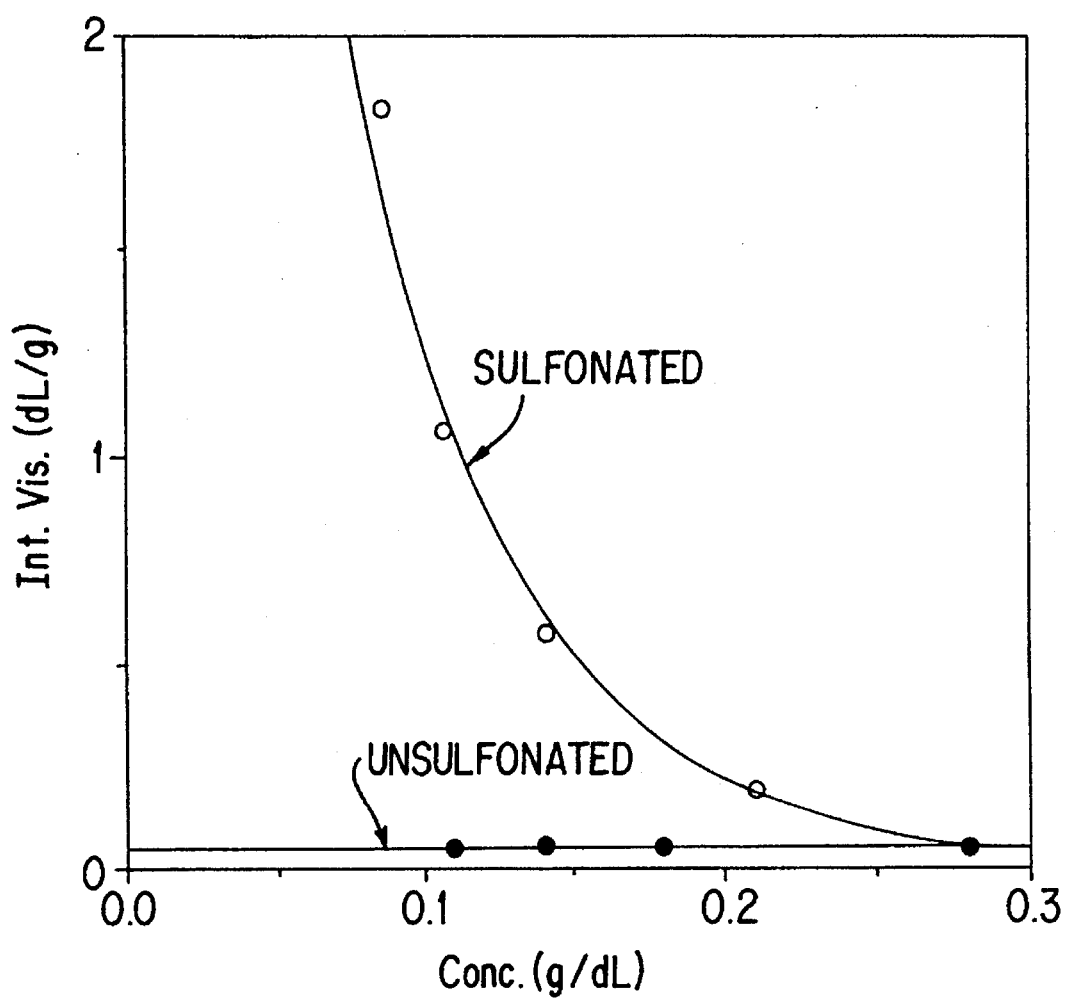
FIG. 2 is a graph of the concentration in grams/dL of polymers 23 ([NP(OCH$_2$CH$_2$OCH$_2$CH$_2$NHBoc)$_2$]n, black bullet) and 28 (NP(OCH$_2$CH$_2$OCH$_2$CH$_2$NH$_2$)$_{0.95}$ (OCH$_2$CH$_2$OCH$_2$CH$_2$NHCH$_2$CH$_2$ CH$_2$SO$_3$H)$_{1.05}$]$_n$, open bullet) in 1M KOH/methanol solution versus reduced viscosity in dL/g. Measurements were obtained at 28° C.
Figure 3A:
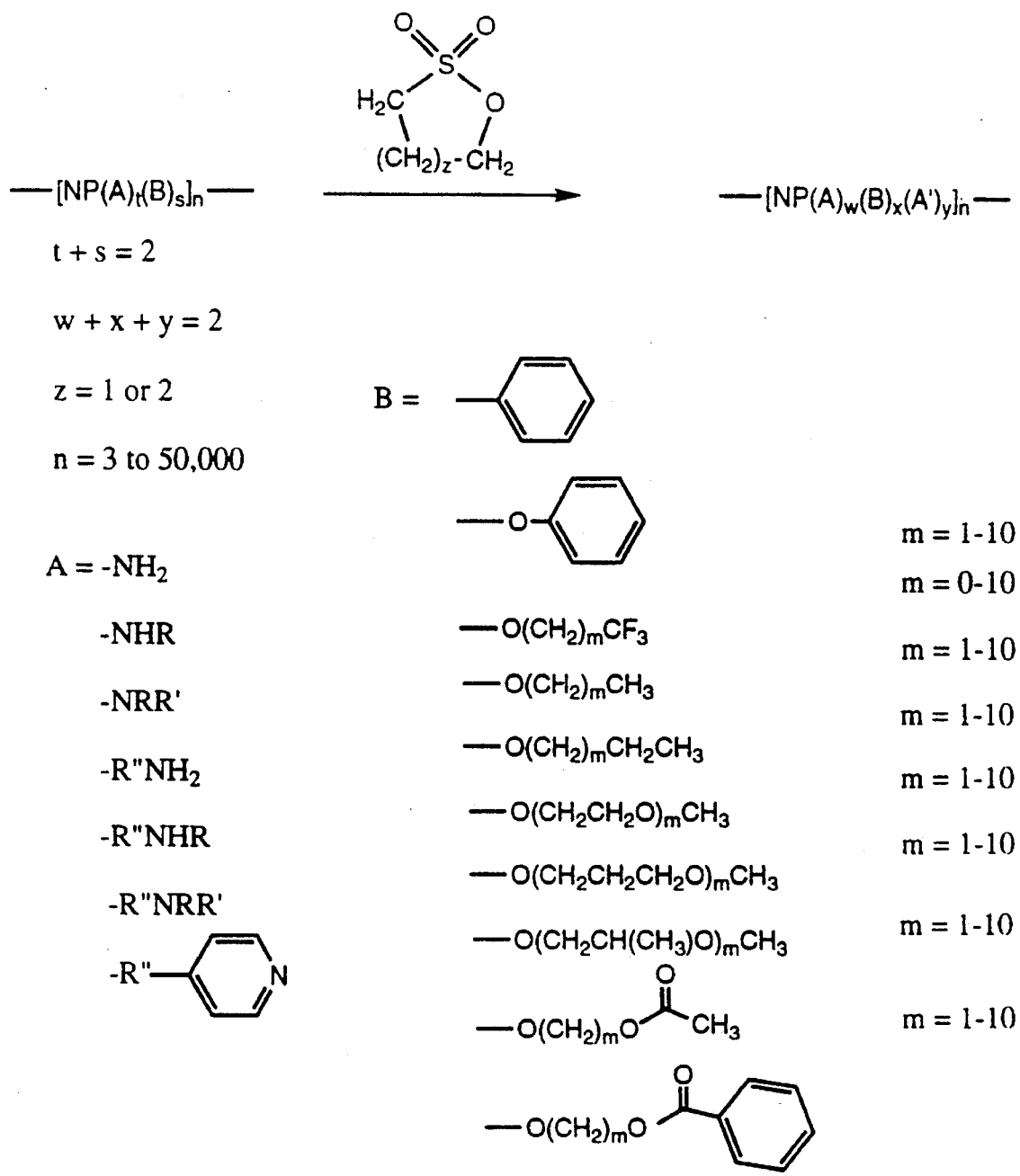
FIGS. 3A, 3B and 3C are illustrations of nonlimiting examples of aminated polyphosphazenes that can be alkylsulfonated according to the present invention.
Figure 3B:
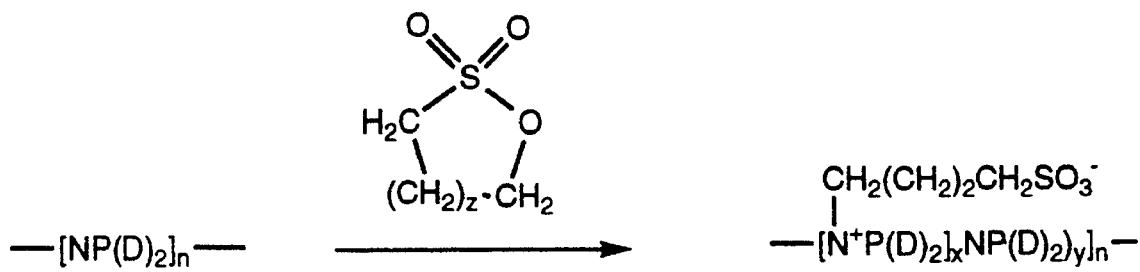
Figure 3C:
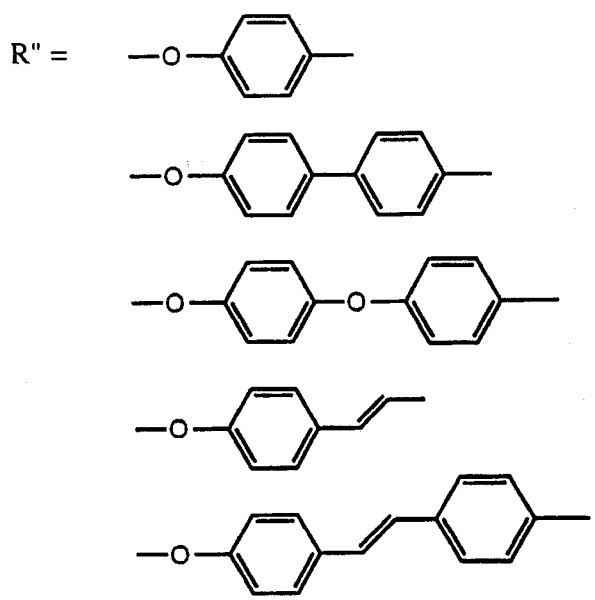
Figure 3C:
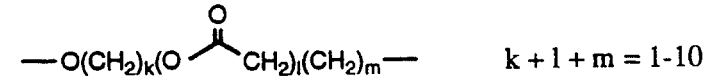
Figure 3C:
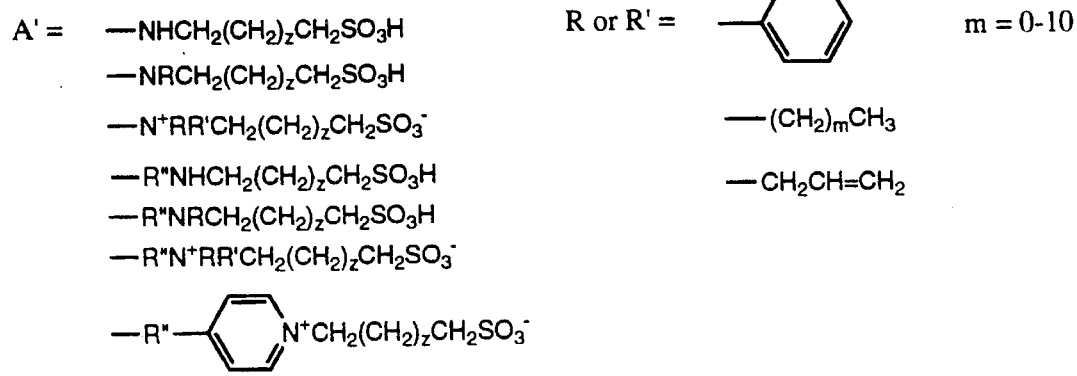

The term alkyl, as used herein, refers to a saturated straight, branched, or cyclic hydrocarbon, or a combination thereof, typically of $C_1$ to $C_{20}$, and specifically includes methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, 2,3-dimethylbutyl, heptyl, octyl, nonyl, and decyl. The alkyl group can be optionally substituted with any desired substituent, including but not limited to one or more moieties selected from the group consisting of hydroxyl, amino, alkylamino, arylamino, alkoxy, aryloxy, nitro, cyano, sulfonic acid, sulfate, phosphonic acid, phosphate, or phosphonate, either unprotected, or protected as necessary, as known to those skilled in the art, for example, as taught in Greene, et al., "Protective Groups in Organic Synthesis," John Wiley and Sons, Second Edition, 1991.

The term (alkyl or dialkyl)amino refers to an amino group that has one or two alkyl substituents, respectively.

The terms alkenyl and alkynyl, as used herein, refers to a $C_2$ to $C_{20}$ straight or branched hydrocarbon with at least one double or triple bond, respectively.

The term aryl or aromatic, as used herein, refers to phenyl or substituted phenyl, wherein the substituent (optionally protected as necessary during the reaction) is, for example, halo, alkyl, alkoxy, alkylthio, haloalkyl, hydroxyalkyl, alkoxyalkyl, methylenedioxy, cyano, C(O)(alkyl), —$CO_2H$, —$OSO_2H$, —$SO_3H$, —$PO_3H$, —$CO_2$alkyl, amide, amino, alkylamino, dialkylamino, or other substituent listed above for the alkyl groups, and wherein the aryl group can have up to 3 substituents.

The term aliphatic refers to a hydrocarbon, typically of $C_1$ to $C_{20}$, that can contain one or a combination of alkyl, alkenyl, or alkynyl moieties, and which can be straight, branched, or cyclic, or a combination thereof.

The term halo, as used herein, includes fluoro, chloro, bromo, and iodo.

The term aralkyl refers to an aryl group with an alkyl substituent.

The term alkaryl refers to an alkyl group that has an aryl substituent, including benzyl, substituted benzyl, phenethyl or substituted phenethyl, wherein the substituents are as defined above for aryl groups.

The term heteroaryl or heteroaromatic, as used herein, refers to an aromatic moiety that includes at least one sulfur, oxygen, or nitrogen in the aromatic ring, and that can be optionally substituted as described above for aryl groups. Nonlimiting examples are furyl, pyridyl, pyrimidyl, thienyl, isothiazolyl, imidazolyl, tetrazolyl, pyrazinyl, benzofuranyl, benzothiophenyl, quinolyl, isoquinolyl, benzothienyl, isobenzofuryl, pyrazolyl, indolyl, isoindolyl, benzimidazolyl, purinyl, carbozolyl, oxazolyl, thiazolyl, isothiazolyl, 1,2,4-thiadiazolyl, isooxazolyl, pyrrolyl, pyrazolyl, quinazolinyl, pyridazinyl, pyrazinyl, cinnolinyl, phthalazinyl, quinoxalinyl, xanthinyl, hypoxanthinyl, pteridinyl, 5-azacytidinyl, 5-azauracilyl, triazolopyridinyl, imidazolopyridinyl, pyrrolopyrimidinyl, and pyrazolopyrimidinyl.

The term heteroalkyl, as used herein, refers to an alkyl group that includes a heteroatom such as oxygen, sulfur, or nitrogen (with valence completed by hydrogen or oxygen) in the carbon chain or terminating the carbon chain.

The term amino acid ester refers to the aliphatic, aryl or heteroaromatic carboxylic acid ester of a natural or synthetic amino acid. The term amino acid, as used herein, refers to both natural and synthetic amino acids, and includes, but is not limited to alanyl, valinyl, leucinyl, isoleucinyl, prolinyl, phenylalaninyl, tryptophanyl, methioninyl, glycinyl, serinyl, threoninyl, cysteinyl, tyrosinyl, asparaginyl, glutaminyl, aspartoyl, glutamoyl, lysinyl, argininyl, and histidinyl.

A method for the sulfonation of polyphosphazenes is provided that produces a variety of sulfonated products, depending on the selection of phosphazene starting material, the selection of the sultone, and the degree of sulfonation.

The degree of sulfonation can be controlled by varying the reaction conditions used in the sulfonation process. For example, by decreasing the polarity of the solvent, the degree of sulfonation is typically decreased, and by increasing the temperature of the sulfonation reaction, the degree of sulfonation is increased.

I. Sulfonation Reagent

Sultones are the internal esters of hydroxysulfonic acids and are the sulfur analogs of lactones. Sultones and their method of preparation are disclosed in Roberts and Williams, *Sultone Chemistry, Tetrahedron,* 43(6), 1027–1060 (1987). Any of the sultones described in this article can be used in the process described herein. A wide variety of sultones are known, including but not limited to saturated and unsaturated aliphatic sultones, and aromatic sultones. If an aromatic sultone is used in the reaction, aromatic sulfonation of the phosphazene is achieved. If an aliphatic sultone is used, aliphatic sulfonation of the phosphazene is achieved.

The preferred alkylsulfonating reagent is 1,3-propane sultone (compound 5, also referred to herein as 1,3-sultone), which is a commercially available sulfonating reagent that can react with a wide variety of amines to produce alkylsulfonated products in high yield (Roberts, D. W. et al., 1987, *Tetrahedron,* Vol. 43, p 1027). The reaction of compound 5 with amines has been shown to proceed under mild reaction conditions, with the structures of the sulfonated products determined by the amine used. Sulfonic acid derivatives are produced when primary or secondary amines react with compound 5. Tertiary amines react with compound 5 to produce zwitterionic species (quaternary amines). Certain polymers containing amino groups, such as polyaniline, have been sulfonated using this process (Goldschmidt, B. et al., 1974, *Heterocycl. Chem.* Vol. 11, p 719).

In an alternative embodiment, 1,4-butanesultone can be used instead of 1,3-propanesultone. The latter compound reacts with primary, secondary and tertiary amines in the same manner as 1,3-sultone, and yields similar products.

The sultone can contain a substituent group in the aliphatic or aromatic portion of the sultone. Alkyl and aryl substituent groups impart hydrophobic character to the resulting polymer.

Methods for preparing sultones have been reviewed by Mustafa, *Chem. Reviews,* 55:195 (1954) and Willems, *Bull. Soc. Chem. Belgium,* 64:409 (1955). A widely adopted method for preparing gamma and delta-sultones from hydroxy sulfonic acids and their analogues, such as halogenosulfonic acids and acyloxy sulfonic acids, is by directly distilling the halogeno or hydroxy sulfonic acids under vacuum, to produce the five, six, and seven membered ring sultones. (Roberts and Williams, supra, at 1028). Sultones can also be made by sulfonation of olefins, especially highly branched olefins. (Roberts and Williams, supra, at 1029).

In the discussion below, for the sake of convenience, the process is often described with reference to 1,3-sultone. However, it should be understood that any other appropriate sultone can be used in place of 1,3-sultone to provide a desired product. Likewise, when the term "alkylsulfonation" is used herein, it should be understood that other types of aliphatic or aromatic sulfonation can be achieved instead, by the appropriate selection of sultone.

II. Phosphazenes Suitable for Sulfonation

Phosphazenes are unique materials in that they have tertiary nitrogen atoms in the backbone of the polymer or cyclic trimer. Alkanesulfonation at the backbone nitrogen atoms produces a zwitterion that may be hydrolytically unstable. Hydrolytically unstable polymers are sought for the controlled delivery of substances and for coatings or devices that degrade over time (for example, biodegradable plastics). In particular, hydrolytically unstable polymers are in demand in the pharmaceutical area for the preparation of controlled drug delivery devices and for sutures, dressings, therapeutic coatings, prosthetic devices, etc.

When alkylsulfonating the backbone nitrogen, it is desired that the phosphazene have at least one substituent group that is electron-donating, to increase the basicity of the endocyclic nitrogen. It is also preferred to minimize the steric bulk of the substituent groups, to allow access to the backbone nitrogen for reaction.

The polymeric or cyclic trimer phosphazenes can have substituted or unsubstituted amino groups attached directly to the backbone phosphorous. Substituted phosphazenes include but are not limited to mono(aliphatic)amino, including alkylamino, di(aliphatic)amino- including dialkylamino-, arylamino-, diarylamino-, heteroarylamino, di(heteroarylamino), and alkylarylamino-.

Alternatively, the reactive nitrogen can be included in a saturated ring, such as pyrrolidine, piperazine or tetrahydropyridine, or in a heteroaromatic ring.

The electron-withdrawing influence of the phosphazene backbone can be reduced by the interposition of a spacer group between the amino, substituted amino group, or other nucleophilic group reacting with the sultone and the phosphorous atoms. The spacing moiety can be any divalent organic group that does not adversely affect the sulfonation reaction. Nonlimiting examples of spacing groups include aliphatic (such as alkyl), aryl, oxyalkyl, oxyaryl, alkaryl, aralkyl, thioalkyl, thioaryl, alkyleneoxy, and polyalkyleneoxy, in which the amino group can be at any desired position in the spacing moiety. Specific examples of substituent groups include —O—[(alkyl)O]$_x$—CH$_2$)$_y$NR$_2$, wherein the alkyl group can vary within the moiety, including —O—[(CH$_2$)$_x$O]$_y$—CH$_2$)$_x$NR$_2$, wherein x is 1–8 (which can vary within the moiety), y is an integer of 1 to 40, and R is hydrogen, aliphatic (especially alkyl), or aryl (which can vary within the moiety).

The polymeric and cyclic trimer phosphazenes that can be sulfonated according to the disclosed method include those with any substituents, and any number of substituents, that do not adversely affect the reaction. Substituent groups that adversely affect the reaction can be protected by means known to those skilled in the art, and deprotected after the sulfonation reaction. Nonlimiting examples of aminated polyphosphazenes that can be sulfonated according to the present invention are illustrated in FIG. 3. Any of the substituent groups listed in FIG. 3 can optionally be used in conjunction with other unlisted groups, as desired, to achieve desired physical and chemical properties.

In an alternative embodiment, the phosphazene can contain one or more nucleophiles that can react with a sultone other than or in addition to an amine, including, but not limited to, sodium, potassium or lithium salts of primary or secondary amines, alcohols, alkoxides, phenols, phenoxides, peroxidates, carboxylate salts, amides, thioamides or sulfonamides (as either their metal (e.g. sodium) derivatives or in the presence of metal alkoxides (such as sodium alkoxides), sodium, potassium, or lithium salts of imides, urea (producing O-alkylated products), thioureas (producing S-alkylated products), salts of thioacids, malonic acid esters, thiols, thiolates, sulfides (to form sulfonium sulfonates), phosphorus compounds such as organic phosphines, neutral esters of trivalent phosphorous acids, phorphorous and phosphoric triamides, and phosphorothionic or phosphorothiolothionic acid esters, or salts. Organometallic compounds have also been shown to react with sultones. Sulfoalkylation has been shown to occur with n-butyl lithium, sodium acetylides, grignard reagents and sodium derivatives of dialkyl malonates and acetoacetates.

Poly(organophosphazenes) can be prepared with two or more types of pendant groups by reacting poly(dichlorophosphazene) with two or more nucleophiles in a desired ratio. In general, when the poly(organophosphazene) has more than one type of pendant group, the groups will vary randomly throughout the polymer. Thus, the poly(organophosphazene) will contain phosphorous atoms which are bound to two like groups or two different groups. The resulting ratio of the two or more pendant groups in the poly(organophosphazene) will be determined by a number of factors, including the ratio of starting materials used to produce the polymer, the temperature at which the nucleophilic substitution reaction is carried out, and the solvent system used. While it is very difficult to determine the exact substitution pattern of the groups in the resulting polymer, the ratio of groups in the polymer can be easily determined by one skilled in the art.

The properties of the phosphazene, such as its degree of hardness, Tg, hydrophilicity, hydrogel or organogel character, acidity, and film forming ability can be controlled through proper selection of the substituent groups. These properties can be further modified by the extent and location of sulfonation.

Nonlimiting examples of substituent groups other than aminated substituent groups that can be present (in a protected form, if necessary, as known to those skilled in the art) in the polymeric or cyclic trimer phosphazene include aliphatic, aryl, aralkyl, alkaryl, amino acid ester, carboxylic acid ester, heteroaromatic, heteroalkyl, heteroaralkyl, -oxyaryl including but not limited to -oxyphenyl-p-methyl, -oxyphenylCO$_2$H, oxyphenylSO$_3$H, -oxyphenylhydroxyl and -oxyphenylPO$_3$H; -oxyaliphatic, including -oxyalkyl, -oxy(aliphatic)CO$_2$H, -oxy(aliphatic)SO$_3$H, -oxy(aliphatic)PO$_3$H, and -oxy(aliphatic)hydroxyl, including -oxy(alkyl)hydroxyl; -oxyalkaryl, -oxyaralkyl, -thioaryl, -thioaliphatic including -thioalkyl, -thioalkaryl, and -thioaralkyl, organosilicon, including but not limited to -(alkyl)-Si(alkyl)$_4$, including —CH$_2$Si(CH$_3$)$_4$; —NHC(O)O—(aryl or aliphatic). The groups can be bonded to the phosphorous atom through, for example, an oxygen, sulfur, nitrogen, or carbon atom. Protecting groups include those taught in Greene, et al., "Protective Groups in Organic Synthesis," John Wiley and Sons, Second Edition, 1991.

Given the disclosure herein, one of skill in the art will be able to sulfonate a wide variety of polymeric and cyclic trimer phosphazenes for a variety of purposes. Variations of the disclosed method and products thereof are considered to fall within the scope of the invention.

II. Method of Sulfonation

The sulfonation reaction can be carried out at any temperature, and for any period of time, that provides the desired results. The degree of sulfonation must be balanced against starting material and product degradation under the reaction conditions. A typical temperature range for the alkylsulfonation of polymeric and cyclic trimer phosphazenes is from approximately 25° C. to the boiling point of a suitable solvent, preferably between 25° and 100° C. Typical reaction times range between approximately one hour and five days. Any range of sultone to reactive site can be used that achieves the desired result. The range of ratios of sultone reactants to reactive site on the phosphazene is typically between approximately 1:1 and 10:1, more preferably between 1:1 and 2.5:1. Water, methanol, and other hydroxyl-containing compounds can compete for the sultone and lower yield.

A challenge existed when sulfonating phosphazenes with sultone to develop the ability to choose the site of alkansulfonation, and consequently to predict the product of the process, thus providing materials with specific chemical and physical properties. Sulfonation reactions were therefore first studied with the use of cyclotriphosphazenes as small molecule models. Because the product of the alkylsulfonation of polymeric and cyclic trimer polyphosphazenes can be affected by the substituent groups on the phosphazene, the model studies were conducted at three levels: (1) with cyclic trimers that contain no amino side groups, and in which the ring nitrogen atoms are the only basic sites; (2) with cyclic trimers that contain amino groups linked directly to the phosphorus atoms of the ring; and (3) with cyclic trimers that bear amino side groups linked to the phosphorus atoms through alkoxy spacer groups. The techniques were then extended to the corresponding polymers. A general synthetic approach to these reactions is shown in Scheme III. From the model studies, knowledge was gained to predict the product of alkylsulfonation of polymeric phosphazenes. In particular, by choosing the appropriate macromolecular cosubstituents, one can sulfonate the backbone nitrogen atom or exclusively sulfonate side group nitrogen atoms or hydroxyl groups. The ability to choose the sulfonation site allows for the production of well defined sulfonated polyphosphazenes for specific uses as ion-exchange resins, non-thrombogenic biomaterials, surfactants, drug delivery systems, polymeric machines, and anti-static materials.

Scheme III

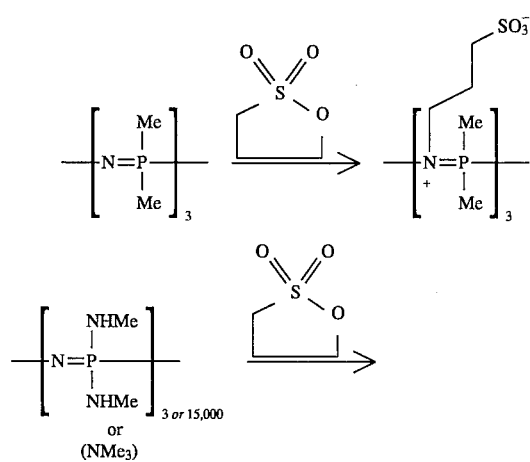

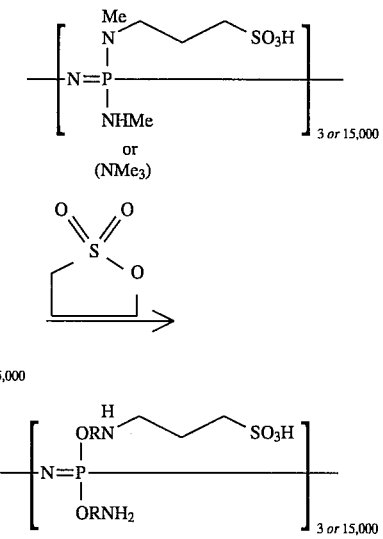

R = Alkoxy spacer

Small-Molecule Cyclotriphosphazene Studies

Model Compounds With No Amino Side Groups

Sulfonation reactions with cyclotriphosphazenes that bear no amino side groups were examined via the reaction of cyclic trimers 6–8 (FIG. 1 and Table I) with 1,3-sultone. Trimers 7 and 8 did not undergo sulfonation with compound 5 in solution or in the melt at 100° C. The steric bulk and electron withdrawing properties of the side groups may explain this result. Both the trifluoroethoxy and phenoxy side groups can withdraw electron density from the phosphazene ring, a process that makes the ring nitrogen atoms less nucleophilic than, for example, in a free amine. However, compound 6 reacts rapidly with compound 5 in the melt at 100° C. to give mono- and di-zwitterionic products (Scheme IV), identified by $^{31}$P NMR spectra and positive ion fast atom bombardment (+Fab) mass spectrometry (Table II). Thus, species 13 and 14 were detected in the $^{31}$P NMR spectra as two AB$_2$ spin systems in close proximity to each other. Compound 13 was formed first (dA–41.6 ppm and dB=20.95 ppm, JAB=12.8 Hz), with compound 14 (dA=41.4 ppm and dB=30.25 ppm, JAB=14.6 Hz) appearing immediately thereafter. $^{31}$P NMR experiments also suggest that the mono-zwitterionic product is readily converted to the di-zwitterion. Apparently, the formation of the di-zwitterion is followed by a breakdown of the molecule since the intensity of a phosphate peak in the $^{31}$P NMR spectra (0 ppm) increases as the reaction continues beyond this point.

TABLE I

Characterization Data for the Starting Cyclotriphosphazenes

| compd | Mp (°C.) | NMR (ppm) $^{31}$P | $^1$H | $^{13}$C | mass spec found (calc) |
|---|---|---|---|---|---|
| $N_3P_3Me_6$ (6) | 194 | 24.4 | 1.4 | 23.4 | 348 (348) |
| $NP_3(OCH_2CF_3)_6$ (7) | 49 | −17.7 | 4.4 | 124.2<br>64.0 | 729 (729) |
| $N_3P_3(OC_6H_6)_6$ (8) | 115 | −9 | 7.3 | 121.2<br>125.0<br>130.1<br>150.0 | 693 (693) |
| $N_3P_3(OC_6H_6)_4(NH_2)_2$ (9) | 104 | 7.8, 16.3<br>$J_{AB}$ = 67 Hz | 2.2, 7.2 | 121.1<br>125.2<br>130.0<br>150.0 | 539 (539) |
| $N_3P_3(OC_6H_6)_6NH_2$ (10) | 65 | 9.3, 18.7<br>$J_{AB}$ = 76 Hz | 2.2, 7.3 | 121.0<br>125.1<br>130.1<br>150.0 | 616 (616) |
| $N_3H_3(OC_6H_6)_6OCH_2CH_2OCH_2CH_2NH_2$ (11) | oil | 9.9, 8.4<br>$J_{AB}$ = 75 Hz | 3.0, 3.7, 4.1, 7.3 | 41.3, 67.2<br>68.0, 71.1<br>121.0<br>124.9<br>130.1<br>150.0 | 704 (704) |
| $N_3P_3(OC_6H_6)_6OCH_2CH_2NMe_2$ (12) | oil | 9.65, 13.3<br>$J_{AB}$ = 84 Hz | 2.0, 2.2, 3.4, 7.3 | 48.1, 52.3<br>69.2<br>121.0<br>124.7<br>130.1<br>150.0 | 688 (688) |

TABLE II

Characterization Data for Alkanesulfonated Cyclotriphosphazenes

| compd | $^{31}$P NMR$_\alpha$ (ppm) vA | vB | vC | Mass spec found (calc) |
|---|---|---|---|---|
| $[N_3P_3Me_6]+[CH_2CH_2CH_2SO_3]−$ (13) | 41.6<br>$J_{AB}$ = 12.8 Hz | 29.95 | | 366(366) |
| $[N_3P_3Me_6]^{2+}[CH_2CH_2CH_2SO_3]_2^{2-}$ (14) | 41.4<br>$J_{AB}$ = 14.6 Hz | 30.25 | | 488(488) |
| $[N_3P_3(OC_6H_5)_4(NH_2)_2]+[CH_2CH_2CH_2SO_3]−$ (15) | 6.1<br>$J_{AB}$ = 82 Hz | 19.6<br>$J_{BC}$ = 67 Hz | 14.8<br>$J_{AC}$ = 62 Hz | 661(661) |
| $[N_3P_3(OC_6H_5)_4(NH_2)(NHCH_2CH_2SO_3H)]+[CH_2CH_2CH_2SO_3]−$ (16)<br>$N_3P_3(OC_6H_5)_5(NHCH_2CH_2CH_2SO_3{}^-+Na)$ (17) | 12.5<br>$J_{AB}$ = 76 Hz | 23.4 | | 785(785) |
| $ZN_3P_3(OC_6H_5)_5(CH_2CH_2SO_3{}^-+Na)_2$ (18) | 13.6<br>$J_{AB}$ = 74 Hz | 27.2 | | 930(930) |
| $N_3H_3(OC_6H_5)_5(OCH_2CH_{2O}CH_2CH_2NHCH_2CH_2CH_2SO_3H)$ (19) | 7.5<br>$J_{AB}$ = 81 Hz | 22.8 | | 826(826) |
| $N_3P_3(OC_6H_5)_5(OCH_2CH2NMe_2+CH_2CH_2CH2SO_3)$ (20) | 9.4<br>$J_A$ = 83 Hz | 13.4 | | 811(811) |

Model Compounds With Amino Groups Linked Directly to the Phosphazene Ring

Cyclic trimer 9, which contains geminal $NH_2$ groups, reacts with compound 5 in refluxing THF to give both mono- and di-alkylsulfonated products (Scheme V). A ring nitrogen atom adjacent to the amino-substituted phosphorus atom reacted first, as determined from $^{31}$P NMR spectra. Thus, the formation of an ABX spin system in the $^{31}$P NMR spectrum indicated that three different

SCHEME IV

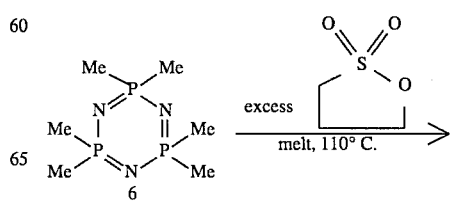

-continued
SCHEME IV

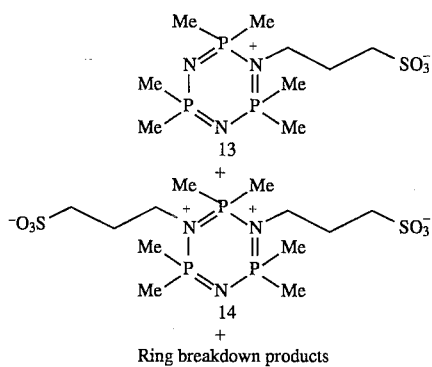

Ring breakdown products

SCHEME V

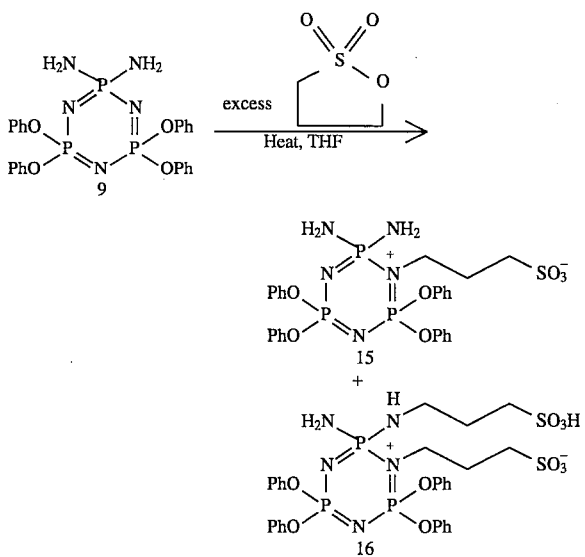

phosphorus environments were present ($d_A$=6.1 ppm, $d_B$=19.6 ppm, and $d_C$=14.8 ppm). This would be expected if alkylsulfonation occurs at a ring nitrogen atom adjacent to the P—NH$_2$ unit to yield the zwitterionic compound 15. An initial reaction at this site is not unexpected, since ring nitrogen atoms are often more basic than exocyclic nitrogen atoms. Two different possibilities exist for the introduction of the second propane sulfonic acid functionality: at the other ring nitrogen atom adjacent to the amino-substituted phosphorus, or at one of the exocyclic nitrogen atoms. Feistel and Rapko have shown that it is possible to alkylate endocyclic nitrogen atoms in preference to ring nitrogen atoms (Feistel, G.; Rapko, J. N., Inorg. Chem. 1970, Vol. 9, No. 6, p 1401). $^{31}$P NMR spectra suggested that the second reaction occurs at one of the exocyclic ring nitrogen atoms. Alkylsulfonation at the second ring nitrogen atom should lead to the formation of only two different phosphorus-environments, with a $^{31}$P NMR spectrum of the AB$_2$ Type. However, the $^{31}$P NMR spectrum obtained was of the ABX type ($d_A$=4.7 ppm, $d_B$=19.3 ppm, and $d_C$=14.4 ppm), which suggests that three different phosphorus environments are still present. Alkylsulfonation at the ring nitrogen atom between the phosphorus atoms that are not linked to amino groups is considered to be unlikely, because of both steric hinderance and the electron withdrawing ability of the phenoxy groups. Therefore, the second site for alkylsulfonation is believed to be one of the exocyclic amino groups, and this would yield three distinct phosphorus environments. The reaction of compound 9 with excess of compound 5 gave not only the mono- or di-reacted products, but also several multiply sulfonated species.

In an attempt to control the degree of sulfonation, cyclic trimer 10, with only one NH$_2$ side group, was employed (Scheme VI). Attempts to alkylsulfonate compound 10 with compound 5 in refluxing THF solutions were not successful. However, the sodium amide of compound 10 reacted with compound 5 to yield both the mono- and di-alkylsulfonated products (17 and 19), which were detected by $^{31}$P NMR spectra and +FAB mass spectra (M$^+$=795 and 930 respectively). The inability of compound 10 to react with compound 5 may again be the result of the steric bulkiness and electron withdrawing ability of the phenoxy side groups. The high reactivity of the sodium amide of compound 10 toward compound 5 apparently overcomes the electronic and steric retardation created by the phenoxy side groups. No evidence was found for ring nitrogen atom reactions based on an analysis of the $^{31}$P NMR spectra. Thus, the $^{31}$P NMR spectra were consistent with the apparent simultaneous formation of both the mono- and di-alkylsulfonated products.

Model Compounds With the Amino Side Groups Linked Through Alkoxy Spacers to the Ring Spacer groups between the exocyclic nitrogen atoms and the electron-withdrawing phosphazene ring should reduce the influence of the phosphazene ring and allow side chain sulfonation to occur under milder reaction conditions. Compounds 11 and 12 react with compound 5 during a period of two to three days at 50° C. Compound 11 reacted with compound 5 to produce the ionic amphiphile compound 19. However, compound 12 reacted to give the zwitterionic product compound 20. The alkylsulfonated products were examined by $^{31}$P NMR, $^{13}$C NMR, $^1$H NMR, and mass spectrometry, and were shown to be compounds 19 and 20 respectively. For example, for the reaction product from compound 11, integration of the propyl proton peaks in the $^1$H NMR spectra (1.8 m, 2.65 t, and 3.3 t) and the ethyleneoxy methylene protons (2.9 t, 3.7 m, and 4.1 t) indicated that only the mono-alkylsulfonated product (compound 19) was formed. $^{31}$P NMR spectra for compounds 19 and 20 suggest that alkylsulfonation takes place at the exocyclic amino groups. Reaction at the ring nitrogen atoms would generate an ABX spin system. However, only AB$_2$ spin systems were detected after alkylsulfonation.

Properties of the Alkylsulfonated Cyclic Trimers

Sulfonation of the trimers changed their solubility dramatically. Compounds 6 and 10–12 are insoluble in water. However, the corresponding alkylsulfonated products show an increased solubility in polar media. Compounds 13–18 are soluble in water. Compounds 19 and 20 do not dissolve in water, but readily absorb water from the atmosphere. $^1$H NMR spectra of 19 and 20 in deuterated chloroform show a significant broading of the propyl proton peaks (1.9 ppm, 2.65 ppm and 3.3 ppm) and a water peak at 5 ppm. The water could be removed by extensive drying under vacuum at 40° C.

Macromolecular Reactions

The sulfonation reaction can be carried out on polyphosphazenes that contain no amino side groups, polyphosphazenes that contain amino (or other nucleophilic) side groups linked directly to the phosphorus atoms of the backbone, and polyphosphazenes that contain amino (or other nucleophilic) groups linked to the polymer backbone through alkoxy spacer groups.

The macromolecular reactions described below were performed in the solution state, and are merely illustrative of the method disclosed herein. These examples are not intended to limit the scope of the invention. Other reagents, starting materials and reaction conditions can be employed to produce a wide variety of products.

The reactions can be carried out as surface reactions, by using any known method, for example, a crosslinked polyphosphazene that has been swelled at the surface with water or an organic solvent, or a polyphosphazene film in a nonsolvent for the polymer.

Alkylsulfonation of Polyphosphazenes Bearing No Amino Side Groups

Polymer 27 ([NP(OCH$_2$CF$_3$)$_2$]$_n$) did not react with compound 5 after 14 days in refluxing THF solution. As discussed for the small-molecule systems, the reaction may not occur because the side groups withdraw electron density from the phosphazene backbone making the backbone nitrogen atoms less basic. This, together with the inhibiting effects of side group steric hindrance, may explain the resistance to alkylsulfonation.

Polyphosphazenes that do not contain reactive substituent nucleophiles but do contain electron donating and/or sterically small substituent groups, including ([NP(CH$_3$)$_2$]$_n$), as opposed to electron withdrawing groups, can be sulfonated under the conditions disclosed herein.

Polymers Containing Amino Groups Linked Directly to the Backbone

Alkylsulfonation of [NP(NMe$_2$)$_{1.12}$(NHMe)0.88]n with compound 5 can be achieved in refluxing THF. Approximately 15% of the amino side groups were alkylsulfonated after two days, as estimated by $^1$H NMR spectroscopy. The reaction terminated when the reacted polymer precipitated from the solution.

The resultant propanesulfonated polyphosphazene, [NP(NMe$_2$)0.88(NMe)0.85(NMe$_2$$^+$CH$_2$CH$_2$CH$_2$SO$_3$$^-$)$_{0.27}$ (NMeCH$_2$CH$_2$CH$_2$SO$_3$H)$_{0.03}$]n (polymer 22), was soluble in water, methanol, and DMSO. The polymer swelled in ethanol and isopropanol. It was insoluble in most common organic solvents such as THF, diethyl ether, toluene, and hexane. This is in contrast to the starting polymer 21, which is insoluble in water and methanol but is soluble in THF and dioxane.

Polymer 22 was examined by $^{31}$P NMR and $^1$H NMR spectroscopy. In principle, alkylsulfonation could take place at three possible sites; at the backbone nitrogen atoms, at the dimethylamino nitrogen atoms, or at the monomethylamino nitrogen atoms. The reaction occurred in part at the dimethylamino groups to give zwitterionic structures, as shown by the $^1$H NMR spectra. A shift occurred in the dimethylamino group proton resonance from 2.4 ppm to 3.2 ppm, which corresponds to the formation of the zwitterion. Integration of the methyl proton peak at 3.2 ppm and the methylene proton peak at 3.6 ppm for the propyl sulfonate group suggested that 90% of alkylsulfonation had occurred at the dimethylamino sites. The remaining 10% of the alkylsulfonation may have occurred on the monomethylamino groups. The sensitivity of polymer 22 to divalent cations provided evidence for the presence of —SO$_3$H units. Addition of calcium ions to an aqueous solution of polymer 22 caused gelation, which was presumably a consequence of ionic crosslinking.

Polymers Containing Amino Groups Linked to the Backbone Through Alkoxy Spacer Groups The alkylsulfonation of polyphosphazenes 23–26, with the general structure [NP(OCH$_2$CF$_3$)x(OCH$_2$CH$_2$OCH$_2$CH$_2$NH$_2$)y]n (X+Y=2) (Tables III and IV), occurred at room temperature over a period of five days in methanol, to produce alkylsulfonated polymers 29–31 (Table IV). In principle, each of the different monomer units illustrated in Scheme VII could have been formed. However, it was not possible to identify each specific monomer unit by $^{31}$P NMR spectroscopy because of overlapping of the peaks. In each case only approximately 50% of the NH$_2$ sites were alkylsulfonated. Raising the reaction temperature to 40° C. and increasing the amount of compound 5 used did not increase the extent of alkylsulfonation of polymer 23. This may be a consequence of competing side reactions between compound 5 and methanol.

All four alkylsulfonated polyphosphazenes 28–31 were studied by DSC, intrinsic viscosity, $^{31}$P, $^{13}$C, and $^1$H NMR (Table IV). The polymers had characteristic chemical shifts in the $^1$H NMR spectra of 1,3-propane sultone residues (1.8 ppm, 2.65 ppm, and 3.3 ppm)

TABLE III

| | Characterization Data for the Starting Polymers | | | | | |
|---|---|---|---|---|---|---|
| | | NMR (ppm) | | | | |
| compd | $^{31}$P | $^{13}$C | $^1$H | [η]$^a$ | T$_g$ (°C.) | elem anal. found (calc) |
| [NP(OCH$_2$CH$_2$OCH$_2$CH$_2$NH$_2$)$_2$]$_n$(23) | −8.5 | 41, 67, 68, 71 | 3.0, 3.5, 3.7, 4.1 | 0.53 | −18 | C: 38.15 (37.90) H: 7.79 (7.90) N: 16.57 (17.31) |
| [NP(OCH$_2$CF$_3$)$_{0.4}$(OCH$_2$CH$_2$OCH$_2$CH$_2$NH$_2$)$_{1.6}$]$_{2n}$(24) | −9 | 41, 64, 67, 68, 71, 124 | 3.0, 3.5, 3.7, 4.1 4.4 | 0.48 | −19 | C: 33.51 (34.02) H: 7.22 (6.70) N: 13.87 (14.23) |
| [NP(OCH$_2$CF$_3$)$_{0.86}$(OCH$_2$CH$_2$OCH$_2$CH$_2$NH$_2$)$_{1.14}$]$_n$(25) | −9.2 | 41, 64, | 3.0, 3.5, | 0.45 | −20 | C: 29.45 (30.02) |

TABLE III-continued

Characterization Data for the Starting Polymers

| compd | NMR (ppm) | | | $[\eta]^a$ | $T_g$ (°C.) | elem anal. found (calc) |
|---|---|---|---|---|---|---|
| | $^{31}P$ | $^{13}C$ | $^1H$ | | | |
| $[NP(OCH_2CF_3)_{1.76}(OCH_2CH_2OCH_2CH_2NH_2)_{0.24}]_n(26)$ | −8.3 | 67, 68, 71, 124 41, 64, 67, 68, 71, 124 | 3.7, 4.1, 4.4, 3.0, 3.5, 3.7, 4.1, 4.4 | 0.32 | −28 | H: 6.12 (5.40) N: 11.00 (11.65) C: 21.47 (21.37 H: 2.03 (2.21) N: 6.87 (6.72) |
| $[NP(OCH_2CF_3)_2]_n(27)$ | −8 | 64, 124 | 4.4 | $1 \times 10^{6b}$ | −67 | |

[a]Viscosity measurements were done in methanol at 32° C. with an Ubbelohde viscometer.
[b]Measured by gel permeation chromatography.

TABLE IV

Chracaterization Data for the Alkanesulfonated Polymers

| compd[a] | NMR (ppm) | | | $[\eta]^b$ | $T_g$ (°C.) |
|---|---|---|---|---|---|
| | $^{31}P$ | $^{13}C$ | $^1H$ | | |
| $NPR'_{0.95}(OCH_2CH_2OCH_2CH_2NHCH_2CH_2CH_2$—$SO_3H)_{1.05}]_n(28)$ | −7.7 | 26.5, 41, 58, 67, 68, 71, 72.5 | 1.8, 2.65, 2.9, 3.3, 3.7, 4.1 | 0.70 | −24 |
| $NPR'_{0.83}R''_{0.4}(OCH_2CH_2OCH_2CH_2NHCH_2CH_2$—$CH_2SO_3H)_{0.77}]_n(29)$ | −8.3 | 26.5, 41, 58, 64, 67, 68, 71, 72.5, 124 | 1.8, 2.65, 2.9, 3.3, 3.7, 4.1, 4.4 | 0.58 | −22 |
| $[NPR'_{0.57}R''_{0.86}(OCH_2CH_2OCH_2CH_2NHCH_2CH_2$—$CH_2SO_3H)_{0.57}]_n(30)$ | −8.4 | 26.5, 41, 58, 64, 67, 68, 71, 72.5, 124 | 1.8, 2.65, 2.9, 3.3, 3.7, 4.1, 4.4 | 0.54 | −21 |
| $[NPR'_{0.1}R''_{1.76}(OCH_2CH_2OCH_2CH_2NHCH_2CH_2$—$CH_2SO_3H)_{0.14}]_n(31)$ | −8.6 | 26.5, 41, 58, 64, 67, 68, 71, 72.5, 124 | 1.8, 2.65, 2.9, 3.3, 3.7, 4.1, 4.4 | 0.52 | −30 |

[a]$R' = OCH_2CH_2OCH_2CH_2NH_2$, $R'' = OCH_2CR_3$.
[b]Viscosity measurements were carried out in methanol at 32° C. with the use of an Ubbelohde viscometer.

and in the $^{13}C$ NMR spectra (26.5 ppm, 58 ppm, and 72.5 ppm). No polymer decomposition was evident, as indicated by the absence of both general peak broadening and a detectable phosphate peak in the $^-P$ NMR spectra.

Solubility Changes

The solubility characteristics of the alkylsulfonated polymers 28–31 were not markedly different from those of the starting polymers. The most notable solubility change occurred following the alkylsulfonation of polymer 31. Before the reaction, polymer 31 was insoluble in water. However, after the polymer had reacted, it was readily soluble in water.

Viscosity measurements of the starting polymers 23–26 in anhydrous methanol were obtained. The intrinsic viscosities of the polymers generally decrease with increasing trifluoroethoxy content. This is presumably due to the increased hydrophobic character of regions of the polymers. The same general trend can be seen with the alkylsulfonated polymers 29–31. The most notable change in polymer properties results from the ionomer characteristics of the alkylsulfonated polymers. Viscosity measurements in 1M KOH/methanol solutions suggest that the alkylsulfonated polymers are ionic. Polymer 23 did not show an increase in reduced specific viscosity, $\eta sp/c$, with dilution. However, the reduced specific viscosity of the corresponding alkylsulfonated polymer, 28, increased with increasing dilution as illustrated in FIG. 2. This polyelectrolyte effect may be the result of electrostatic repulsions between the sulfonic anion units. The relationship between concentration and viscosity was exponential, as expected for ionomers. However, solutions of the alkylsulfonated polymers in anhydrous methanol showed no increase in viscosity with dilution. This is consistent with the view that the sulfonic acid functionalities remained essentially unionized in anhydrous methanol.

Glass Transition Temperatures

The glass transition temperatures ($T_g$) of the product polymers were very similar to those of their nonsulfonated precursors. This is probably a consequence of the separation between the alkylsulfonation sites and the polymer backbone and the relatively low degree of sulfonation, especially in the case of polymers 26 ($T_g$=−28° C.) and 31 ($T_g$=−30° C.). The largest decrease in $T_g$ following sulfonation is seen in the comparison of 23 ($T_g$=−18° C.), with 28 (Tg=−24° C.). This presumably reflects an increase in free volume associated with the alkylsulfonic acid units.

Equipment and Characterization Procedures $^{31}P$, $^1H$, and $^{13}C$ NMR spectra were obtained with the use of a Bruker WM360 spectrometer. Chemical shifts are relative to external 85% $H_3PO_4$($^{31}P$) or tetramethylsilane ($^1H$ and $^{13}C$). All heteronuclear NMR spectra were proton decoupled. A Kratos MS90/50 spectrometer was used to obtain the +FAB mass spectra. Perkin-Elmer-7 thermal equipment was used to obtain the DSC thermograms. All viscosity measurements were carried out using a Cannon Ubbelhode capillary viscometer. Viscosity measurements were done in methanol at 28° or 32° C. Elemental microanalyses were performed by Galbraith Laboratories, Knoxville, Tenn.

Hexachlorocyclotriphosphazene (provided by Ethyl Corp.) was purified by vacuum sublimation, recrystallization from heptane, and a final sublimation before use. Poly(dichlorophosphazene) was obtained by the thermal polymerization of hexachlorocyclotriphosphazene at 250° C. in an evacuated sealed tube. Phenol (Aldrich) was purified by vacuum sublimation and was stored in a desiccator before use. 1,3-Propane sultone (Aldrich), 2-dimethylaminoethanol (Aldrich), and 2-(2-aminoethoxy)ethanol (Aldrich) were vacuum distilled and stored under argon. 2,2,2-Trifluoroethanol (Halocarbon) was dried and stored over molecular sieves. Sodium metal (Aldrich) was stored and used in a glovebox. t-Butyldicarbamate (Aldrich) was used as received. Triethylamine was distilled from calcium hydride before use. Ammonia (Matheson), monomethylamine (Matheson), dimethylamine (Matheson), and hydrogen chloride gas (Matheson) were used as received. Solvents were dried and distilled under nitrogen by standard methods.

EXAMPLE 1

Synthesis of [NP(OCH$_2$CF$_3$)$_2$]n (Compound 27)

Trifluoroethanol (11.00 g, 0.110 mol was dissolved in 200 mL THF and was added dropwise into a 1000 mL round bottom flask containing sodium metal (2.32 g, 0.1009 mol) immersed in 230 mL of THF. The solution was stirred for 12 hours. Poly(dichlorophosphazene) (2.00 g, 0.0174 mol) was dissolved in 200 mL THF in a Schlenk flask. The polymer solution was cannulated into an addition funnel and was added dropwise to the alkoxide solution. The resulting solution was heated to reflux for 15 hours. After cooling to room temperature, the solution was concentrated and reprecipitated into water twice and into hexanes twice. The polymer was obtained in a 40% yield.

EXAMPLE 2

Synthesis of [NP (OCH$_2$CH$_2$OCH$_2$CH$_2$NHBoc)2]n

A mixture of the boc-protected amino ethoxyethanol (5.90 g, 26.08 retool) and NaIl (1.04 of 60% dispersion, 26.09 mmol) in THF (250 mL) was stirred for 4 hours at room temperature to give a pale yellow solution. This was added to a solution of poly(dichlorophosphazene) (1.00 g, 8.7 mmol) and the solution was stirred at room temperature for 12 h. The polymer was purified by dialysis against methanol (5 days), 90% yield.

EXAMPLE 3

Synthesis of [NP(OCH$_2$CH$_2$OCH$_2$CH$_2$NH$_2$)$_2$]n (Compound 23)

The boc protected polymer, [NP(OCH$_2$CH$_2$OCH$_2$CH$_2$NHBoc)$_2$]n was dissolved in 80% trifluoroacetic acid and was stirred at room temperature for 24 hours. The solution was then made alkaline (pH 9) with 1M NaOH solution and was dialyzed against methanol for five days. Yield 80%.

EXAMPLE 4

Synthesis of [NP(NMe$_2$)(NHMe)]n (Compound 21)

To a solution of poly(dichlorophosphazene) (1.00 g, 8.7 mmol) in THF (150 mL) was added by condensation (dry ice condenser) 8.7 mmol of dimethyl amine. This solution was stirred at room temperature for 12 hours. Excess monomethylamine was then condensed into the solution and the mixture was stirred for an additional 12 hours. The resultant polymer was purified by reprecipitations into water (x 3) and hexanes (x 3) to give the pure polymer in 70% yield.

EXAMPLE 5

Typical Synthesis of [NP(OCH$_2$CF$_3$)x(OCH$_2$CH$_2$OCH$_2$CH$_2$)-NHBoc)y]n

The sodium salt of trifluoroethanol was prepared from trifluoroethanol and NaH in THF. This suspension was added dropwise to a solution of poly(dichlorophosphazene) in THF. After the solution had been stirred for 24 hours at room temperature, the sodium alkoxide of the boc-protected amino ethoxyethanol in THF (prepared in a similar way to the sodium trifluoroethoxide) was added to the polymer solution. The mixture was stirred for 12 hours, concentrated on a rotary evaporator, and dialyzed against methanol for 5 days.

EXAMPLE 6

Typical synthesis of [NP(OCH$_2$CF$_3$)x(OCH$_2$CH$_2$OCH$_2$CH$_2$NH$_2$)y] (Compounds 24, 25, 26)

The corresponding boc protected polymers were dissolved in 80% trifluoroacetic acid and were stirred for 24 hours. The solutions were made alkaline (pH 9) with 1M NaOH solution at 0° C. The polymers were then dialyzed against methanol for 5 days.

EXAMPLE 7

Alkylsulfonation of Compound 11

Compound 11 (2.00 g, 2,84 mmol) was dissolved in 50 mL THF and 5 (0–50 g, 4.10 mmol) was added as a THF solution (20 mL). The solution was stirred at room temperature (25° C.) for 5 days. The solution was poured into 70 mL water and was extracted with chloroform (3×50 mL). The chloroform was removed under reduced pressure to give 19 in 60% yield. Characterization: $^1$H NMR; 1.8 m (2H), 2.6 t (2H), 3.0 t (2H), 3.4 t (2H), 3.7 m (4H), 4.1 t (2H), 7.3 m (25H); $^{13}$C NMR; 26.5, 40.8, 58.0, 67.0, 67.9, 71.2, 72.5, 121.0, 125.0, 129.8, 150.0.

EXAMPLE 8

Alkylsulfonation of Compound 12

Compound 8 (0.24 g, 0.0351 mol) was dissolved in THF (10 mL), and 5 (0.08 g, 0.0656 mol) in THF (5 mL) was added via syringe. The resulting solution was stirred at room temperature for 16 hours. The solution was poured into 50 mL of water and the product was extracted with diethyl ether (3×20 mL). The etheral layer was filtered through a 2 cm silica plug and was dried over MgSO$_4$. Evaporation of the ether left yellow oil 20 in 50% yield. Characterization: $^1$H NMR; 2.2 m (2H), 2.7 t (2H), 3.1 t (2H), 3.2 t (2H), 3.6 s (6H), 4.6 t (2H), 7.3 m (25H); $^{13}$C NMR; 26.0, 49.8, 52.2, 58.0, 69.1, 121.0, 125.0, 130.1, 150-0.

EXAMPLE 9

Synthesis of (NP(NMe$_2$) 0.85 (NHMe) 0.85 (NMe$_{2+}$CH$_2$CH$_2$ CH$_2$SO$_3^-$) 0.27 (NMeCH$_2$CH$_2$CH$_2$SO$_3$H) 0.03]n

[NP(NMe$_2$) (NHMe)]n (1 g) was dissolved in dry THF in a Schlenk flask, and 2 equivalents of 1,3-propane sultone were added via syringe. The reaction was carried out under argon. The solution was then stirred in refluxing THF for 48 hours at which time the polymer precipitated from the solution. The alkylsulfonated polymer was then purified by dialysis against deionized water (3 days) and methanol (3 days). The product polymer was obtained in 95% yield.

EXAMPLE 10

Typical Synthesis of [NP(OCH$_2$CF$_3$)x(OCH$_2$CH$_2$OCH$_2$CH$_2$NH$_2$)y (OCH$_2$CH$_2$OCH$_2$CH$_2$NHCH$_2$CH$_2$CH$_2$SO$_3$H)z]n Compound 5 (0.90 g, 7.4 mmol) was added to 6.15 mmol of the precursor polymer in 10 mL of methanol. The solution was stirred at room temperature for five days and was then dialyzed against water for 3 days and methanol for 5 days. The solvent was then removed under reduced pressure to give a white polymeric product. The sulfonated polymer was obtained in quantitative yield.

Modifications and variations of the present method of synthesis of alkylsulfonated polymeric phosphazenes and compositions resulting thereof will be obvious to those skilled in the art from the foregoing detailed description of the invention. Such modifications and variations are intended to come within the scope of the appended claims.

We claim:

1. A method for the sulfonation of a polymeric or cyclic trimer polyphosphazene that includes reacting the polyphosphazene with a sultone.

2. The method of claim 1, wherein the sultone is 1,3-propane sultone.

3. The method of claim 1, wherein the polyphosphazene contains a nucleophilic group capable of participating in a nucleophilic substitution reaction with the sultone.

4. The method of claim 3, wherein the nucleophilic group is an amine.

5. The method of claim 3, wherein the nucleophile is selected from the group consisting of the sodium, potassium or lithium salts of primary or secondary amines, alcohols, alkoxides, phenols, phenoxides, peroxidates, carboxylate salts, amides, thioamides or sulfonamides, sodium, potassium, or lithium salts of imides, urea, thioureas, salts of thioacids, malonic acid esters, thiols, thiolates, sulfides, phosphorus compounds such as organic phosphides, neutral esters of trivalent phosphorous acids, phorphorous and phosphoric triamides, and phosphorothionic or phosphorothiolothionic acid esters or salts, and organometallic moieties.

6. The method of claim 1, wherein the sultone is a saturated aliphatic sultone.

7. The method of claim 1, wherein the sultone is an unsaturated aliphatic sultone.

8. The method of claim 1, wherein the sultone is an aromatic sultone.

9. The method of claim 1, wherein the polyphosphazene further contains a substituent group selected from the group consisting of mono(aliphatic)amino-, di(aliphatic)amino- arylamino, diarylamino-, heteroarylamino-, di(heteroaryl)amino- and aralkylamino-, wherein the chain length of alkyl aliphatic groups in the substituent is between $C_1$ and $C_{20}$.

10. The method of claim 3, wherein the nucleophile is separated from the phosphazene backbone by a spacer group.

11. The method of claim 10, wherein the spacer is selected from the group consisting of aliphatic, aryl, oxyalkyl, oxyaryl, alkaryl, thioalkyl, thioaryl, alkylenoxy, and polyalkyleneoxy, wherein the chain length of alkyl and aliphatic groups in the spacer is between $C_1$ and $C_{20}$.

12. The method of claim 1, wherein the phosphazene contains a substituent group selected from the group consisting of —O—[(alkyl)O]$_x$—CH$_2$)$_y$N$_2$, wherein the alkyl group can vary within the moiety, wherein x is 1–8 (which can vary within the moiety), y is an integer of 1 to 40, and R is hydrogen, aliphatic, or aryl (which can vary within the molecule).

13. The method of claim 12, wherein the substituent group is —O—[(CH$_2$)$_x$O]$_y$—CH$_2$)$_x$NR$_2$.

14. The method of claim 1, wherein the phosphazene contains a moeitiy selected from the group consisting of aliphatic, aryl, aralkyl, alkaryl, amino acid ester, carboxylic acid ester, heteroaromatic, heteroalkyl, heteroaralkyl, -oxyaryl -oxyphenylCO$_2$H, oxyphenylSO$_3$H, -oxyphenylhydroxyl and -oxyphenylPO$_3$H; -oxyaliphatic, -oxy(aliphatic)CO$_2$H, -oxy(aliphatic)SO$_3$H, -oxy(aliphatic)PO$_3$H, and -oxy(aliphatic)hydroxyl, -oxyalkaryl, -oxyaralkyl, -thioaryl, -thioaliphatic, and organosilicon, protected as necessary during the reaction.

15. A sulfonated polyphosphazene of the formula:

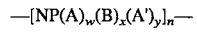

—[NP(A)$_w$(B)$_x$(A')$_y$]$_n$— wherein:

$$w + x + y = 2$$
$$n = 3 \text{ to } 50{,}000$$

A = —NH$_2$
—NHR
—NRR'
—R"NH$_2$
—R"NHR
—R"NRR'

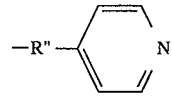

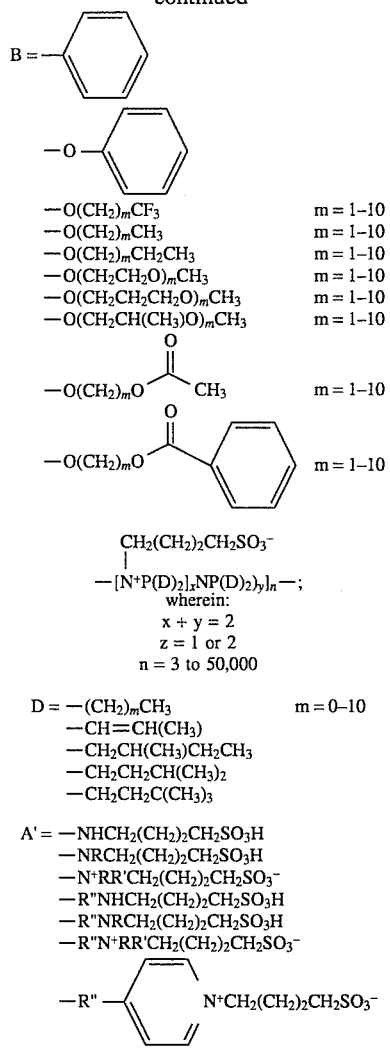
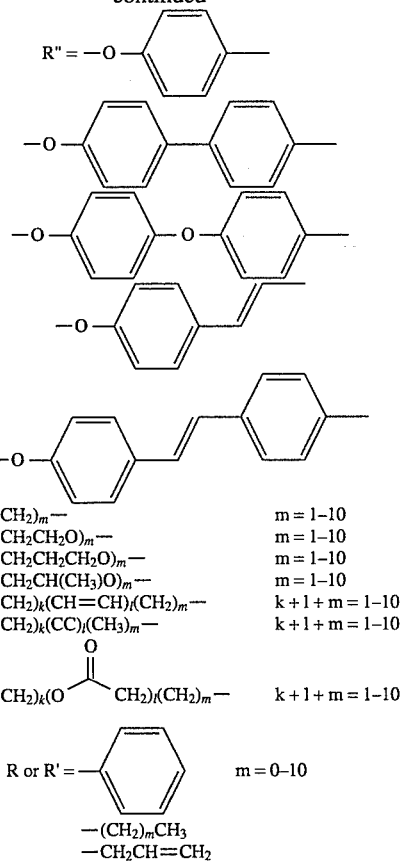
16. Articles of manufacture selected from the group consisting of biomedical material, membrane, reversibly cross-linkable material, surfactant and polyelectrolyte comprising the polymer of claim 15.
* * * * *

UNITED STATES PATENT AND TRADEMARK OFFICE
CERTIFICATE OF CORRECTION

PATENT NO. : 5,548,060
DATED : August 20, 1996
INVENTOR(S) : Allcock, H.R., et al.

It is certified that error appears in the above-indentified patent and that said Letters Patent is hereby corrected as shown below:

On the title page, item [75] Inventors:
Please replace "P. Weller" with --F. Welker--.

Signed and Sealed this

Eleventh Day of February, 1997

Attest:

BRUCE LEHMAN

*Attesting Officer*         *Commissioner of Patents and Trademarks*